United States Patent [19]

Brunken

[11] Patent Number: 5,090,542

[45] Date of Patent: Feb. 25, 1992

[54] TORSIONAL OSCILLATION DAMPER

[75] Inventor: Gerd Brunken, Dittelbrunn, Fed. Rep. of Germany

[73] Assignee: Fichtel & Sachs AG, Schweinfurt, Fed. Rep. of Germany

[21] Appl. No.: 665,777

[22] Filed: Mar. 7, 1991

[30] Foreign Application Priority Data

Mar. 10, 1990 [DE] Fed. Rep. of Germany ....... 4007697

[51] Int. Cl.$^5$ .......................... F16D 47/02; F16D 3/14
[52] U.S. Cl. ................................ 192/106.1; 192/58 B; 192/70.17; 464/24; 464/64
[58] Field of Search ................. 192/106.1, 106.2, 58 B, 192/70.17; 464/24, 64, 68

[56] References Cited

U.S. PATENT DOCUMENTS

| 4,540,076 | 9/1985 | Bopp | 192/106.1 X |
| 4,674,991 | 6/1987 | Tojima et al. | 192/106.2 X |
| 4,768,637 | 9/1988 | Bopp et al. | 192/106.1 |
| 4,790,792 | 12/1988 | Bopp | 192/106.2 X |
| 4,838,107 | 6/1989 | Herrmann | 192/106.1 X |
| 4,840,262 | 6/1989 | Herrmann | 192/106.1 X |

FOREIGN PATENT DOCUMENTS

| 503089 | 7/1930 | Fed. Rep. of Germany . |
| 2848748 | 5/1980 | Fed. Rep. of Germany . |
| 3624498 | 1/1988 | Fed. Rep. of Germany . |
| 2626337 | 7/1989 | France . |

Primary Examiner—Leslie A. Braun
Assistant Examiner—Andrea Pitts
Attorney, Agent, or Firm—Toren, McGeady & Associates

[57] ABSTRACT

The torsional oscillation damper intended in particular for the driving train of a motor vehicle comprises a disc part 11 which is rotatable round an axis of rotation and a housing part 17 which is equiaxially rotatable relative to the disc part 11, at least partially surrounds the disc part 11 and, together with the disc part 11, limits at least one damper chamber which is sealed from the exterior for receiving a viscous damper fluid. A displacement member 31 arranged on the disc part 11 or on the housing part 17 in each damper chamber divides the damper chamber into two displacement compartments which are connected to one another by a throttle channel 41. The disc part 11 and the housing part 17 are resiliently coupled together by a plurality of springs 23. On the side of the damper chamber located toward the axis of rotation 1 there are adjoined shearing gaps 47, 49 which are open toward the displacement compartments thereof and into which at least a proportion of the damper fluid from the damper chambers can escape during the relative rotation of disc part 11 and housing part 17. The quantity of damper fluid filling is calculated such that it is centrifuged substantially completely into the damper chamber in the absence of rotary oscillations and, as the oscillation amplitude increases, is displaced from the damper chamber into the shearing gaps 47, 49 to produce a frictional moment.

13 Claims, 2 Drawing Sheets

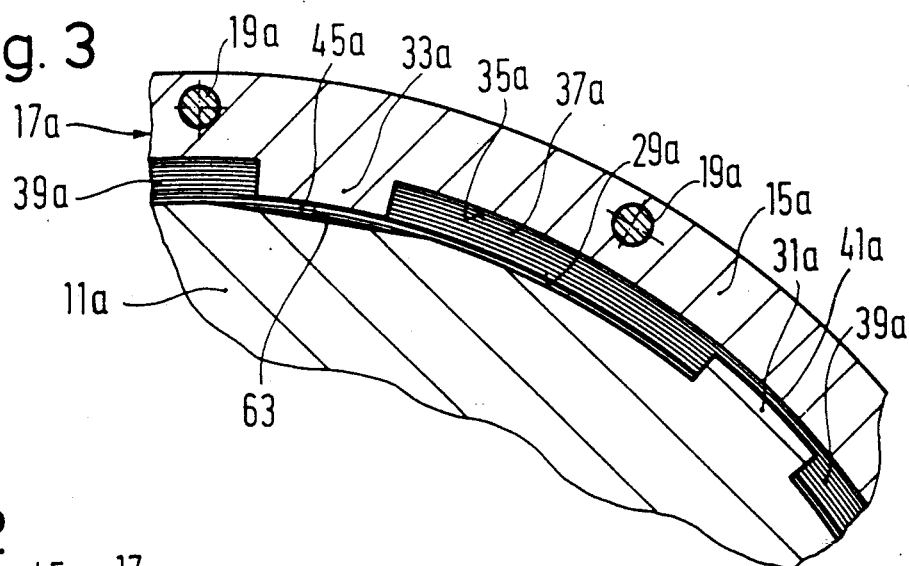
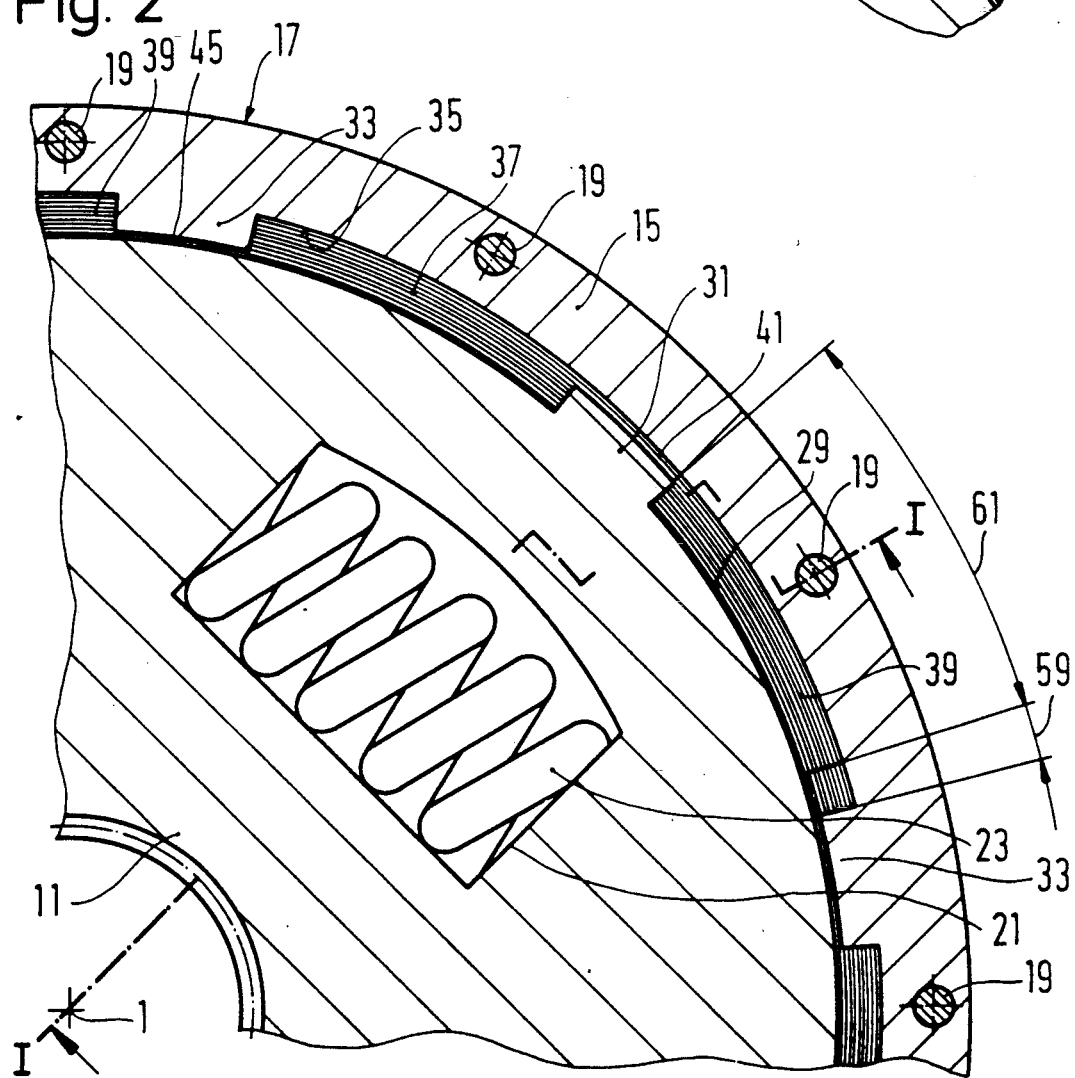

TORSIONAL OSCILLATION DAMPER

BACKGROUND OF THE INVENTION

The invention relates to a torsional oscillation damper, in particular for the driving train of a motor vehicle.

A torsional oscillation damper for the driving train of a motor vehicle is known from DE-A-28 48 748, in which a disc part which is rotatable round an axis of rotation is arranged axially between lateral walls of a housing part which is rotatable coaxially to the disc part. The disc part is resiliently coupled to the housing part via a plurality of helical springs. A plurality of recesses, into which displacement members projecting radially inwardly from the internal periphery of the housing part engage, is provided on the external periphery of the disc part. The recesses form damper chambers which are limited by the disc part and the housing part, are filled with damper fluid, are sealed from the exterior and are each divided into two displacement compartments by the displacement members. A peripheral gap is provided between the base of each of the recesses and the displacement member extending into the recess. The peripheral gap forms a throttle channel through which the damper fluid can pass from one displacement compartment into the other during a relative rotation of disc part and housing part. The cross section of the throttle channel is dimensioned such that a damping effect is produced during torsional oscillations. Adaptation of the damping effect to a plurality of operating states, particularly when using the torsional oscillation damper in the driving train of a motor vehicle, has proven problematic and does not satisfy the requirements of a number of operating states.

SUMMARY OF THE INVENTION

It is an object of the invention to provide a torsional oscillation damper of which the damping effect can be adapted with comparatively inexpensive constructional parts better than hitherto to the oscillation amplitude and oscillation frequency to be damped.

The torsional oscillation damper according to the invention which is particularly suitable for the driving train of a motor vehicle comprises a disc part which is rotatable round an axis of rotation as well as a housing part which at least partially surrounds the disc part, is coaxially rotatable relative to the disc part and, together with the disc part, limits at least one damper chamber which is sealed from the exterior for receiving damper fluid. A displacement member arranged on the disc part or on the housing part, in each damper chamber, divides the damper chamber into two displacement compartments which are connected to one another by a connecting path, in particular a throttle channel. At least one, preferably several spring elements, for example helical springs, couple the disc part resiliently to the housing part.

The improvement according to the invention to the rotary oscillation damper resides in the fact that the disc part and the housing part limit, on the side of the damper chamber located toward the axis of rotation, at least one shearing gap which is open toward the displacement compartments and into which at least a proportion of the damper fluid from the damper chambers can escape during the relative rotation of disc part and housing part. The shearing gap can simultaneously form the above-mentioned connecting path.

During operation of the torsional oscillation damper, the damper fluid accumulates in the damper chamber owing to the centrifugal force. The quantity of damper fluid filling is calculated such that the shearing gap is free from damper fluid or at most only partially filled with damper fluid in the absence of torsional oscillations. In the event of rotary oscillations, the displacement member displaces the displacement fluid via the connecting path or the throttle channel from one displacement compartment of the damper chamber into the other. Depending on the amplitude and the frequency of the rotary oscillation, the displacement fluid is additionally also displaced against the centrifugal force into the shearing gap. The liquid friction increases the damping effect in the shearing gap.

In a preferred embodiment of the invention, the quantity of damper fluid filling is calculated such that the displacement compartments are only partially filled with damper fluid in a relative rest position of housing part and disc part determined by the spring element. As a result, in the case of low oscillation amplitudes of the type occurring, in particular, during idling of the internal combustion engine of the motor vehicle, the shearing gap is emptied completely and the liquid friction effect completely shut off. The disc part and the housing part have to be twisted relative to one another over a limited angle of relative rotation before the displacement effect of the displacement member drives fluid into the shearing gap and the liquid friction effect commences.

A similar effect, by means of which the damping effect is reduced with low oscillation amplitudes, can be achieved if the throttle channel is constructed as a peripheral gap limited by faces of the disc part and of the housing part and one of these gap faces is shaped such that, during the relative rotation of disc part and housing part it constricts the gap cross section in both directions, starting from a relative rest position determined by the spring element. Damping which is dependent on the angle of rotation can therefore be achieved in the case of displacement compartments substantially completely filled with displacement fluid.

In a preferred embodiment, the housing part extends with its internal periphery beyond the external periphery of the disc part. In the peripheral direction, a plurality of damper chambers is distributed between external periphery of the disc part and internal periphery of the housing part, the damper chambers being divided into successive displacement compartments by displacement members which project radially outwardly from the disc part and project radially inwardly from the housing part alternately in the peripheral direction. Comparatively large-volume displacement chambers can be achieved for large angles of relative rotation particularly if the width of the displacement members in the peripheral direction is smaller than the width of the displacement compartments (in the relative rest position). The throttle channels are preferably formed by peripheral gaps radially between the internal periphery of the housing part and the displacement members of the disc part and/or by peripheral gaps radially between the external periphery of the disc part and the displacement members of the housing part. Whereas the external periphery of the disc part is constructed substantially as a cylindrical face between its displacement members, the gap faces opposite the displacement members of the housing part for limiting the throttle channel can be constructed as simple flattened regions in order thus to obtain a progression of the damper effect which is dependent on the angle of relative rotation.

In a preferred embodiment of the invention, shearing gaps are provided axially on either side of the disc part between the disc part and adjacent lateral walls of the housing part to increase the damping effect. A further increase in the liquid friction effect and therefore in the damping effect is achieved if the disc part and the lateral walls of the housing part are provided, in the region of the shearing gaps, with annular ribs and grooves which are concentric to one another and to the axis of rotation and alternate in the radial direction such that the ribs of the disc part and of the lateral walls engage in grooves in the other respective part. The ribs and grooves enlarge the shearing gap face available for liquid friction.

The damper chamber is preferably arranged in the region of the external periphery of the disc part so that the spring element can be arranged radially between the axis of rotation and the external periphery in an aperture of the disc part while the shearing gap extends radially between the external periphery and the aperture of the disc part. The housing part preferably has, on either side of the disc part, lateral walls which extend radially beyond the spring element and are provided with control edges for coupling to the spring element. The lateral walls tightly surrounding the disc part are preferably sealed relative to the disc part radially between the axis of rotation and the aperture. The torsional oscillation damper can be constructed compactly, particularly in the case of a shearing gap provided with grooves and ribs of the above-mentioned type.

Separate twist angle stops can be dispensed with if at least one of the displacement members simultaneously forms a limiting stop.

The torsional oscillation damper is preferably a constituent of a clutch disc of a friction clutch, the disc part being provided with a hub and the housing part with clutch friction linings. The housing part can advantageously be formed from two substantially identical housing halves which are connected to one another in the region of their external periphery by rivets which at the same time hold spring segments of the clutch friction linings on the housing part. The advantage of such a design is its simple construction.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention is described in more detail hereinafter with reference to drawings.

FIG. 2 shows a partial axial cross section through the clutch disc, viewed along a line II—II in FIG. 1.

FIG. 3 shows a partial cross section through a variation of a clutch disc.

DESCRIPTION OF PREFERRED EMBODIMENTS

Figure 1:
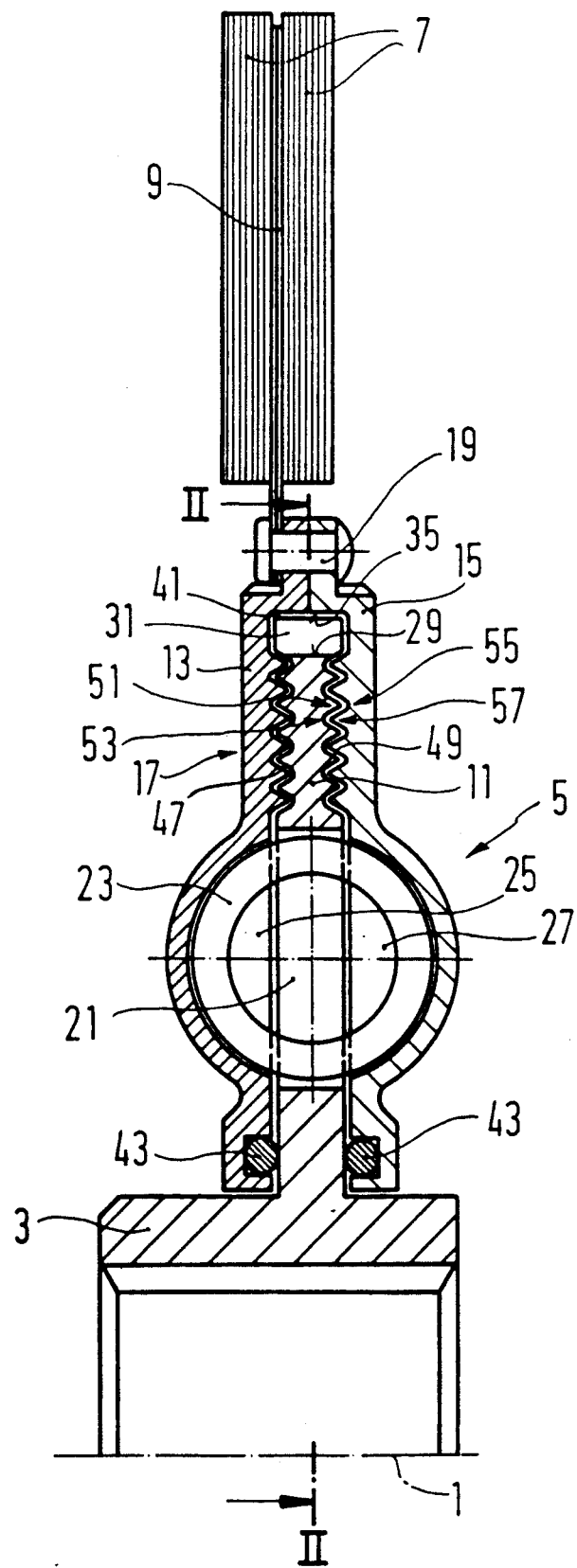
FIG. 1 shows an axial longitudinal section through half of a clutch disc of a motor vehicle friction clutch, viewed along a line I—I in FIG. 2.

The clutch disc illustrated in FIGS. 1 and 2 and rotating round an axis of rotation 1 comprises a hub 3 which can be placed non-rotatably but axially movably in the conventional manner on a gearshaft (not shown) and on which clutch friction linings 7 are held via lining spring segments 9 via a torsional oscillation damper 5. The torsional oscillation damper 5 comprises a disc part in the form of a substantially circular disc shaped hub disc 11 extending radially outwardly from the hub 3 and a housing part 17 which is composed of two substantially identical lateral discs 13, 15 and is rotatably guided coaxially to the hub 3 and the hub disc 11 on these components over a limited angle of rotation. The resilient segments 9 of the friction linings 7 are at the same time fixed on the housing part 17 by rivets 19 which are provided on the external periphery of the lateral discs 13, 15 and rigidly connect the two lateral discs 13, 15 to one another. A plurality of helical springs 23 which, via control edges 25 of the lateral discs 13, 15, couple the hub disc 11 resiliently to the housing part 17 and therefore to the friction linings 7, is distributed in the peripheral direction and rests in apertures 21 in the hub disc 11.

To damp rotary oscillations between the housing part 17 and the hub disc 11 there is provided, along the substantially circular cylindrical external periphery 29 of the hub disc 11, a plurality of displacement members 31 which project radially outwardly from the external periphery 29 and, in the peripheral direction, engage between displacement members 33 which project radially inwardly from the internal periphery 35 of the housing part 17 which is also substantially circular-cylindrical and extends with radial spacing from the external periphery 29. Displacement members 33 of the housing part 17 which are adjacent in the peripheral direction limit, together with the internal periphery 35 of the housing part 17 and the external periphery 29 of the hub disc 11, damper chambers in each case which are divided into two displacement compartments 37, 39 by the interposed displacement members 31 of the hub disc 11. The displacement compartments 37, 39 contain a displacement fluid which can flow via throttle channels each in the form of a peripheral gap 41 from one displacement compartment into the other displacement compartment. The lateral walls 13, 15 of the housing part 17 are closed for this purpose and extend beyond the helical springs 23 radially inwardly into the region between hub 3 and helical springs 23 where they are sealed relative to the hub disc 11 by sealing rings 43 (FIG. 1). Similarly to the damper compartments 37, 39, displacement members 31 of the hub disc 11 which are adjacent in the peripheral direction also form between themselves damper chambers which are divided into two respective displacement compartments by the displacement members 33. Throttle channels 45 in the form of a peripheral gap are likewise provided between the external periphery 29, the hub disc 4 and the displacement members 33.

Shearing gaps 47, 49 which are open toward the displacement compartments 37, 39 and extend substantially to the region of the helical springs 23 adjoin the displacement compartments radially inwardly on either side of the hub disc 11. The shearing gaps 47, 49 are limited by the lateral faces of the hub disc 11 on the one hand and the axially adjacent lateral faces of the two lateral discs 13, 15 on the other hand. Concentrically arranged, radially alternating ribs 51 and grooves 53 on the lateral faces of the hub disc 11 engage in complementary grooves 55 and ribs 57 of the axially adjacent lateral disc 13 or 15 in order thus to enlarge the shearing gap face. The shearing gaps 47, 49, when filled with viscous displacement fluid, produce a moment of liquid friction which damps rotary oscillations between the hub disc 11 and the housing part 17.

The helical springs 23 hold the hub disc 11 relative to the housing part 17 when the torsional oscillation damper is not loading with torque in a rest position in which the two displacement compartments 37, 39 of each damper chamber are substantially equal in size. The quantity of damper fluid filling, which is a viscous liquid, is calculated so as to be smaller than the volume of all damper chambers. With the clutch disc which rotates in operation, the damper fluid is centrifuged radially outwardly-into the displacement compartments 37, 39. Providing no rotary oscillations are superimposed on the rotational movement, the displacement compartments 37, 39 completely receive the damper fluid and the emptied shearing gaps 47, 49 do not produce a moment of liquid friction. If rotary oscillations are superimposed on the rotating movement, the volumetric ratio of the displacement compartments 37, 39 changes. With slow rotary oscillations, the damper fluid contained in the displacement compartments 37, 39 can be compensated via the peripheral gaps 41, 45. As the frequency of rotary oscillations increases, the volume of the damper compartments 37 changes more rapidly than the damper fluid can be compensated by the peripheral gaps 41, 45. As the oscillation frequency increases and the oscillation amplitude increases, the damper fluid progressively escapes into the radially adjoining shearing gaps 47, 49 and produces a moment of liquid friction which damps the rotary oscillation. As the quantity of damper fluid filling is calculated so as to be smaller than the total volume of the damper chambers, the hub disc 11 can twist round a relative angle of rotation 59 (FIG. 2) before the displacement compartments of decreasing volume are completely filled with damper fluid and the damper fluid begins to flow out into the shearing gaps 47, 49. The angle of rotation 59 determined by the difference in the quantity of filling determines the working range during idling of the internal combustion engine, in which the irregularity of the rotational movement of the internal combustion engine is not sufficient to displace the damper fluid into the shearing gaps 47, 49. During idling, the liquid friction is reduced to a minimum. During load running, the higher torque to be transmitted is sufficient to shift the rotary oscillations into an angular region 61 in which the displacement compartment which is decreasing in volume in each case displaces damper fluid into the shearing gaps 47, 49. The increasing moment of liquid friction allows rotary oscillations of higher amplitude to be damped, of the type produced, for example, owing to the increasing irregularity or during a sudden change of load due to opening or closing of the throttle. A corresponding damping situation arises during passage through natural frequencies which also allow the oscillation amplitude to increase. The moment of liquid friction is also increased automatically thereby. If, for example, the torque transmitted by the clutch is increased by a load change, the viscous torque gradually accumulates again in the displacement compartments 37, 39 owing to the centrifugal force and the low oscillation amplitudes occurring during subsequent uniform travel of the motor vehicle are damped again with only slight liquid friction.

As the two lateral discs 13, 15 of the housing part 17 are substantially identical in construction, the clutch disc can be produced very inexpensively. The adaptation of the frictional moment can be optimised in wide ranges by the use of viscous liquids of differing viscosity.

It goes without saying that either the displacement member 33 or the displacement member 31 can optionally also rest in a sealing manner on the respective radially adjacent peripheral face. However, both types of displacement member 31 and 33 can rest in a sealing manner on the respectively opposed peripheral wall 35 or 29. In this case, the radially externally located regions of the shearing gaps 47, 49 form connecting paths with throttle channel effect.

FIG. 3 shows a variation of the clutch disc which allows adaptation of the damping properties in the range of lower oscillation amplitudes. The clutch disc in FIG. 3 differs from the clutch disc in FIGS. 1 and 2 substantially only by the design of the throttle channels. Identically acting parts are provided with reference numerals from FIGS. 1 and 2 with the letter a for distinction. Reference is made to the description of FIGS. 1 and 2 for explanation of these components of the clutch disc and of other components thereof not shown in more detail.

The region of the otherwise circular cylindrical outer peripheral face 29a of the hub disc 11a radially opposed to the displacement members 33a of the housing part 17a in the region of the rest position of relative rotation of hub disc 11a and housing part 17a is flattened over more than the peripheral width of the damper member 33a. The resultant gap face 63 of the peripheral gap 45a extending tangentially to the peripheral face 29a leads to a throttle cross section of the peripheral gap 45a which, starting from the rest position, constricts continuously during a relative rotation of hub disc 11 and housing part 17a. The peripheral length of the flattened gap face 63 determines an angle of relative rotation in which the throttle cross section is enlarged and the damping effect therefore reduced. With the clutch disc in FIG. 3, the quantity of damper fluid filling can be selected substantially identical to the total volume of the damper chambers, as the enlarged throttle cross section keeps the liquid friction to a minimum in the case of low oscillation amplitudes or low relative excursion in the range of lower torques to be transmitted.

The hub disc of the clutch disc described hereinbefore has the form of a plate. It goes without saying that the lateral faces can also be conical in construction. In the embodiments illustrated, the angle of relative rotation between hub disc and housing part is limited by the displacement member. Other rotation limiting stops can obviously also be provided instead of it.

While specific emodiments of the invention have been shown and described in detail to illustrate the application of the inventive principles, it will be understood that the invention may be embodied otherwise without departing from such principles.

What I claim is:

1. Torsional oscillation damper, in particular for the driving train of a motor vehicle comprising a disc part (11) which is rotatable round an axis of rotation (1), a housing part (17) which at least partially surrounds the disc part (11), is coaxially rotatable relative to the disc part (11) and, together with the disc part (11), limits at least one damper chamber, which is sealed, for receiving damper fluid, a displacement member (31, 33) arranged on the disc part (11) or on the housing part (17), in each damper chamber, divides the damper chamber into two displacement compartments (37, 39), a connecting path (41, 45), which connects the two displacement compartments (37, 39), for each damper chamber and at least one spring element (23) resiliently coupling together the disc part (11) and the housing part (17), wherein the disc part (11) and the housing part (17) limit, on a side located toward the axis of rotation (1) of at least one damper chamber, at least one shearing gap (47, 49) which is open toward the displacement compartments (37, 39) and into which at least a proportion of the damper fluid from the damper chambers can escape during the relative movement of disc part (11) and housing part (17).

2. Torsional oscillation damper according to claim 1, wherein the damper fluid filling is of a quantity that is calculated such that the displacement compartments (37, 39) are only partially filled with damper fluid in a relative rest position of housing part (17) and disc part (11) determined by the spring element.

3. Torsional oscillation damper according to claim 1 wherein the connecting path comprises a peripheral gap (45a) limited by faces (35a, 63) of the disc part (11a) and of the housing part (17a) and forming a throttle channel, and one of its gap faces (63) is shaped such that, during the relative rotation of disc part (11a) and housing part (17a), it constricts a cross section of the gap in both directions starting from a relative rest position determined by the spring element (23).

4. Torsional oscillation damper according to claim 1, wherein the housing part (17) has an internal periphery (35) that extends beyond an external periphery (29) of the disc part (11), and a plurality of damper chambers distributed in a peripheral direction is provided between external periphery (20) of the disc part (11) and internal periphery (35) of the housing part (17) and wherein the damper chambers are divided into successive displacement compartments (37, 39) by displacement members (31) projecting radially outwardly from the disc part (11) and displacement member (33) projecting radially inwardly from the housing part (17), preferably alternately in the peripheral direction.

5. Torsional oscillation damper according to claim 4, wherein the connecting paths (41, 45) comprise throttle channels formed by one of peripheral gaps radially between the internal periphery (35) of the housing part (17) and the displacement members (31) of the disc part (11) and peripheral gaps (11) between the external periphery (29) of the disc part (11) and the displacement members (33) of the housing part (17).

6. Torsional oscillation damper according to claim 5, wherein the disc part (11), between its displacement members (31), has a flat, tangentially extending gap face (63) which limits the peripheral gap (45) relative to the displacement member (33) of the housing part (17) and to which cylindrical faces (29) are adjoined on either side in the peripheral direction.

7. Torsional oscillation damper according to claim 1 wherein the housing part (17) has lateral walls (13, 15) which, axially on either side of the disc part (11) together with the disc part (11), limit substantially radially extending shearing gaps (47, 49).

8. Torsional oscillation damper according to claim 7, wherein the disc part (11) and the lateral walls (13, 15) of the housing part (17) are provided in a region of the shearing gaps (47, 49) with annular ribs (51, 57) with grooves (53, 55) which are concentric to one another and to the axis of rotation (1) and alternate in a radial direction such that the ribs (51, 57) of the disc part (11) and of the lateral walls (13, 15) respectively engage in grooves (53, 55) of the housing part and disc part.

9. Torsional oscillation damper according to claim 1 wherein the damper chamber is arranged in a region of an external periphery (29) of the disc part (11) and the spring element (23) is arranged radially between the axis of rotation (1) and an external periphery (29) in an aperture (21) of the disc part (11), wherein the shearing gap (47, 49) is arranged radially between external periphery (29) and the aperture (21) of the disc part (11) and wherein the housing part (17) has, on either side of the disc part (11), lateral walls (13, 15) which extend radially beyond the spring element (23) and are provided with control edges (25, 27) for coupling to the spring element (23).

10. Torsional oscillation damper according to claim 9, wherein the lateral walls (13, 15) tightly surround the disc part (11) and are sealed relative to the disc part (11) radially between the axis of rotation (1) and the aperture (21).

11. Torsional oscillation damper according to claim 1, wherein at least one displacement member (31, 33) simultaneously forms a limiting stop for limiting an angle of relative rotation between disc part (11) and housing part (17).

12. Torsional oscillation damper according to claim 1, wherein it is a constituent of a clutch disc of a friction clutch, the disc part (11) being provided with a hub (3) and the housing part (17) with clutch friction linings (7).

13. Torsional oscillation damper according to claim 12, wherein the housing part (17) comprises two substantially identical housing halves (12, 13) which are connected to one another in an region of their external periphery by rivets (19) which at the same time hold spring segments (23) of the clutch friction linings (9) on the housing part (17).

* * * * *